United States Patent [19]

Tsubouchi et al.

[11] Patent Number: 4,736,768
[45] Date of Patent: Apr. 12, 1988

[54] RELIEF VALVE OF HYDRAULIC DEVICES

[75] Inventors: Kaoru Tsubouchi, Toyota; Kaoru Nakamura, Anjo; Chiaki Ochiai, Chiryu; Genji Mizuno, Toyota; Kenji Shirai, Mishima; Shigeru Sakamoto, Susono, all of Japan

[73] Assignees: Aisin Seiki Kabushiki Kaisha, Kariya; Toyota Jidosha Kabushiki Kaisha, Toyota, both of Japan

[21] Appl. No.: 911,996

[22] Filed: Sep. 26, 1986

[30] Foreign Application Priority Data

Sep. 26, 1985 [JP] Japan .................. 60-147157[U]
Jan. 29, 1986 [JP] Japan .................. 61-11332[U]

[51] Int. Cl.⁴ .............................................. F16K 15/04
[52] U.S. Cl. .................... 137/514; 137/493.3; 137/533.13; 137/539
[58] Field of Search ........... 137/514, 533.13, 539; 251/64

[56] References Cited

U.S. PATENT DOCUMENTS

| | | | |
|---|---|---|---|
| 1,901,217 | 3/1933 | Yerkes | 137/533.13 |
| 2,682,281 | 6/1954 | Ecker | 137/533.13 |
| 2,981,285 | 4/1961 | Nilo | 137/533.13 X |
| 3,002,528 | 10/1961 | Leissner | 137/539 |
| 3,421,547 | 1/1969 | Aslan | 137/539 |

FOREIGN PATENT DOCUMENTS 2363926  2/1975  Fed. Rep. of Germany ...... 137/539

Primary Examiner—Robert G. Nilson
Attorney, Agent, or Firm—Oblon, Fisher, Spivak, McClelland & Maier

[57] ABSTRACT

A relief valve used for hydraulic devices such as the master cylinder for motor vehicles, comprising a housing for passing hydraulic fluid therethrough to adjust the hydraulic pressure, a ball valve disposed in the housing, a coil spring for pushing the ball valve in the housing and plural finger-like portions formed in the inside of the housing to resiliently nip the ball valve so as to prevent the vibration of ball valve in the direction of diameter of the housing at the time of releasing hydraulic fluid through the inside of the housing, thereby making it possible to avoid the generation of strange noise by the vibration of ball valve. It is desirable to form the surface of valve body or the valve body side surface of the finger-like portions so that it has a surface roughness within a specific range in order to make the noise prevention effect more perfect.

4 Claims, 3 Drawing Sheets

RELIEF VALVE OF HYDRAULIC DEVICES

BACKGROUND OF THE INVENTION

1. Field of the Invention

The present invention relates to a relief valve used for various hydraulic devices such as a master cylinder of brake device for motor vehicles, particularly, to a relief valve having a ball-shaped valve body and a coil spring for biasing the valve body to its seating position, said valve body and coil spring being disposed in a housing forming a passageway for releasing hydraulic fluid.

2. Prior Art

The conventional relief valve belonging to the aforementioned kind of relief valve is disclosed, for example, in the Japanese laid-open patent bulletin of Toku-kaisho No. 60-45168. In this relief valve, when the hydraulic pressure increases to reach a predetermined degree, the valve body separates from the valve seat and hydraulic fluid is released through a ring gap between the valve body and the housing, thereby preventing any further increase of hydraulic pressure.

The conventional relief valve having the aforementioned construction, however, has a drawback in that it tends to generate a strange peep noise, as the valve body vibrates in the direction of the diameter of the valve seat when the hydraulic fluid is released through the ring gap.

SUMMARY OF THE INVENTION

The object of the present invention is to provide a relief valve which can avoid the aforementioned drawback of causing strange noise by preventing the vibration of the valve body in the direction of the diameter of the valve seat.

The further object of the present invention is to provide a relief valve having the above feature without requiring any additional parts and being easy to produce.

In accordance with the present invention, the housing is formed to have a plurality of resilient finger-like portions which extend to a ring gap between the valve body and the housing through a ring gap between the coil spring and the housing so as to guide the valve body in the direction of the axis of the valve seat by resiliently nipping the valve body. By this construction, the generation of strange noise can be avoided because the finger-like portions prevent the movement and vibration of the valve body in the direction of the diameter of the valve seat at the time of releasing hydraulic fluid, without requiring any additional parts. Further, such finger-like portions are easy to form, as it is possible to make the finger-like portions contact the valve body even if the finger-like portions are formed in somewhat imprecise dimensions.

Further, it is desirable to form the valve body side surface of finger-like portions so that it has a surface roughness (as defined by the standard of ISO Recommendation R-468-1966), within the range of 18-35 $\mu$mRz or to form the surface of valve body so that it has a surface roughness within the range of 0.5-12.5 $\mu$mRz. Such surface roughness of the surface of finger-like portions or valve body makes it possible to ensure the prevention of the strange noise by the slide resistance between the valve body and the finger-like portions.

Other and further objects of features and advantages of the present invention will be understood more clearly and fully from the detailed description of preferred embodiments with reference to the attached drawings.

DETAILED DESCRIPTION OF PREFERRED EMBODIMENTS

Figure 1:
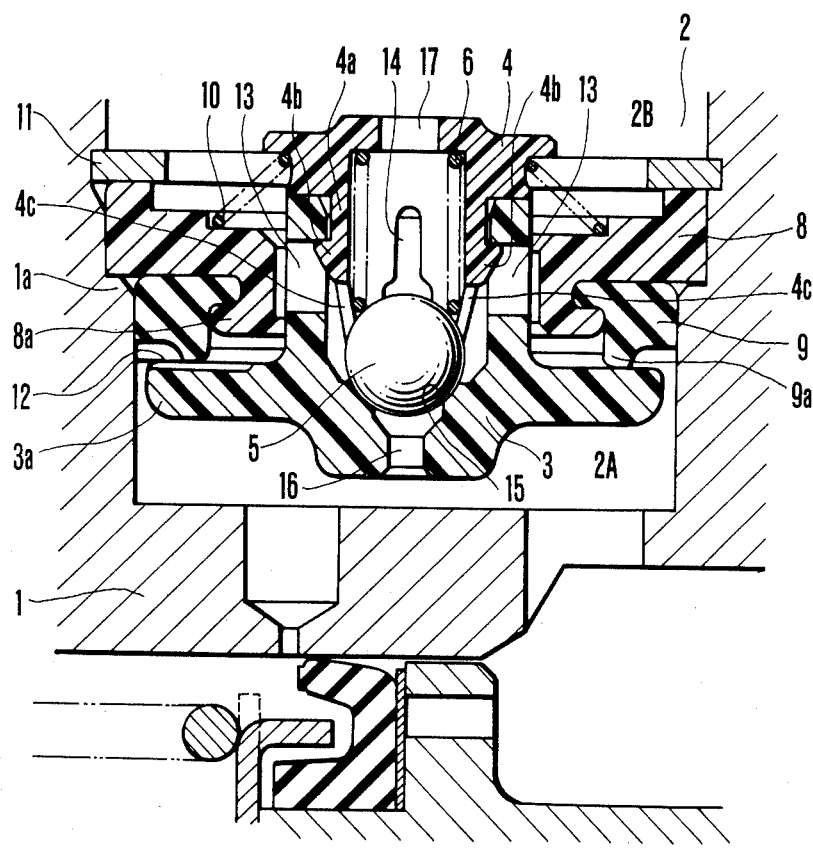
FIG. 1 shows a longitudinal sectional view of one embodiment of the relief valve in accordance with the present invention.

Referring to FIG. 1, there is shown a relief valve and a check valve disposed in a reservoir connecting hole 2 of a master cylinder body 1. The relief valve comprises first housing 3, second housing 4, ball-shaped valve body 5 and coil spring 6, while the check valve comprises ring plate 8, valve seat member 9 and a coil spring 10. The relief valve is to prevent the further-increase of hydraulic pressure at lower portion 2A of reservoir connecting hole 2 by releasing hydraulic pressure to upper portion 2B of reservoir connecting hole 2 when the hydraulic pressure at lower portion 2A of reservoir connecting hole 2 reaches a predetermined value, while the check valve is to prevent the generation of excessive negative pressure at lower portion 2A of the reservoir connecting hole 2 by making fluid in upper portion 2B to be absorbed into lower portion 2A of reservoir connecting hole 2 when the pressure at lower portion 2A of the reservoir connecting hole 2 becomes negative.

Ring plate 8 is restrained from its downward movement by shoulder portion 1a of the inside wall surface of reservoir connecting hole 2 and restrained from its upward movement by snap ring 11 fitted to the side wall of reservoir connecting hole 2. Ring plate 8 has valve seat fixing portion 8a protruding downward from its inner circumference. Valve seat member 9 is made of rubber material and hermetically fixed to the outer circumference of valve seat fixing portion 8a of plate 8. The outer surface of valve seat member 9 contacts hermetically to the inside wall surface of reservoir connecting hole 2. A flange 3a which is formed at the outer surface of housing 3 is contacted with ring-like protruding portion 9a of valve seat member 9 by coil spring 10. Narrow channel 12 formed on flange 3a is to prevent the increase of hydraulic pressure or the generation of negative pressure.

Second housing 4 which is made of resin material such as nylon reinforced with fiber-glass has cylindrical portion 4a inserted into first housing 3. On the outer circumference of cylindrical portion 4a, there are formed two protrusions 4b to be fitted to the upper edges of two windows 13 formed in first housing 3. Cylindrical portion 4a of second housing 4 has slit 14 to give resilience to the cylindrical portion and to shorten the distance between two protrusions 4b. This makes it possible to insert the cylindrical portion into first housing 3 through its upper opening. Valve body 5, of which the surface roughness is set up within the range of 0.5–12.5 μmRz, is biased by coil spring 6 to a position for seating ring-like valve seat 15 formed on first housing 3, while it is pushed by the hydraulic pressure at lower portion 2A of the reservoir connecting hole 2 through an opening 16 of the first housing 3, so as to be separated from the valve seat 15.

Figure 2:
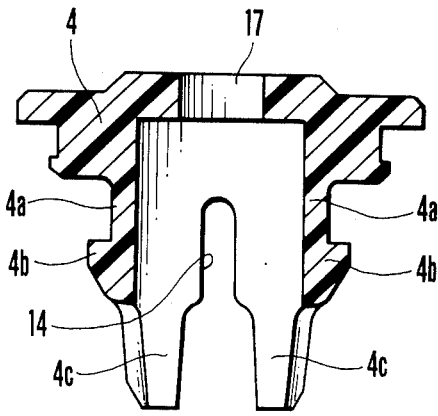
FIG. 2 shows a longitudinal sectional view of the second housing in the relief valve of FIG. 1.
Figure 3:
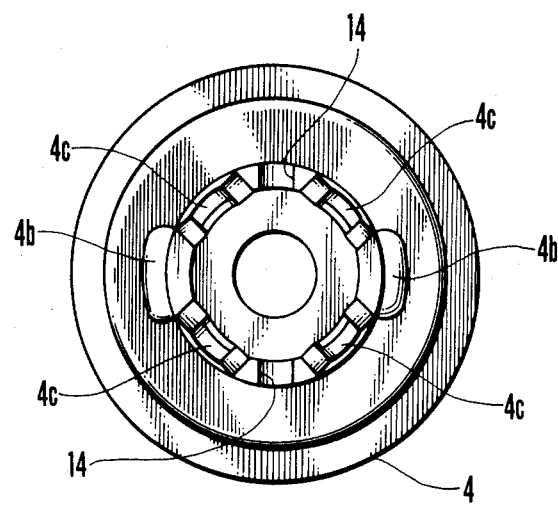
FIG. 3 shows a bottom view of the second housing of FIG. 2.

As mentioned in FIGS. 1 through 3, at the lower end of cylindrical portion 4a of second housing 4, there are unitarily formed four fingers 4c extending downward. The ends of these fingers reach the ring gap between valve body 5 and first housing 3 by passing through the ring gap between coil spring 6 and first housing 3. Thus, fingers 4c resiliently nip valve body 5 in the direction of the diameter of valve seat 15 and guide valve body 5 in the direction of the axis of valve seat 15 (namely, in the upward-downward direction in FIG. 1).

Figure 4:
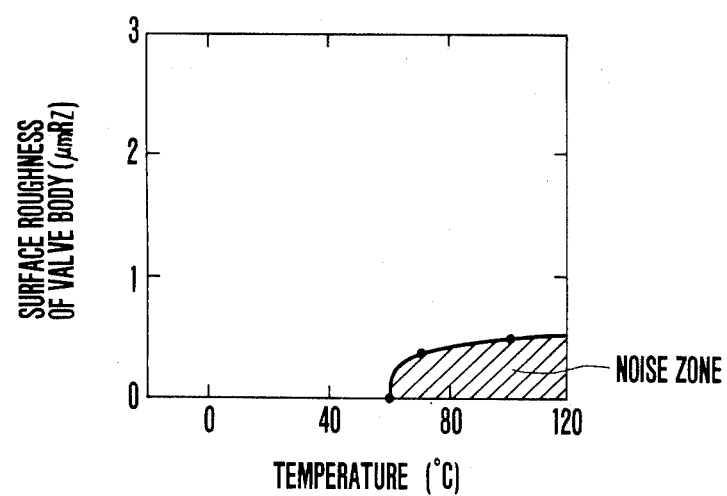
FIG. 4 shows the characteristics of relation between the surface roughness ($\mu$mRz) of the valve body and the brake fluid temperature (°C.) in the embodiment of FIG. 1.
Figure 5:
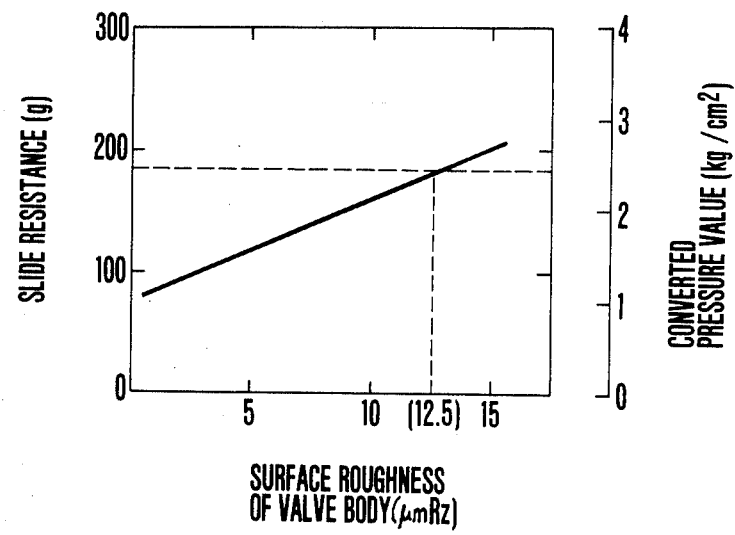
FIG. 5 shows the characteristics of relation between the surface roughness ($\mu$mRz) of the valve body and the slide resistance (g) in the embodiment of FIG. 1.

In the relief valve of the above construction, when the hydraulic pressure at lower portion 2A of the reservoir connecting hole 2 increases to reach a predetermined value (8 Kg/cm$^2$), the hydraulic pressure overcomes the biasing force of coil spring 6 and valve body 5 separates from valve seat 15 by sliding along the inside surfaces of fingers 4c. Consequently, hydraulic fluid in lower portion 2A of reservoir connecting hole 2 flows into the inside of first housing 3 via opening 16 and is released to upper portion 2B of the reservoir connecting hole 2. Under these conditions, the valve body does not vibrate in the direction of the diameter of valve seat 15, as the valve body is nipped resiliently by fingers 4c and the surface roughness is set within the range of 0.5–12.5 μmRz. As seen from FIG. 4 which shows the characteristics of relation between the surface roughness (μmRz) of valve body 5 and the brake fluid temperature (in the condition that the piston stroke speed of the master cylinder is approximately 80 mm/sec), as well as FIG. 5 which shows the characteristics of relation between the surface roughness (μmRz) of valve body 5 and the slide resistance (g), the surface roughness in the range provided in the present invention is adequate for preventing strange noise by using slide resistance between valve body 5 and finger 4c, as such range of surface roughness does not effect the predetermined value of hydraulic pressure in the lower section 2A of reservoir connecting hole nor cause a bad brake feeling owing to the unnecessary increase of stepping force of the brake pedal. Thus, the generation of strange peep noise which was observed in the conventional relief is prevented.

Though the surface of valve body 5 is formed so that it has the surface roughness within the range of 0.5–12.5 μmRz in the above embodiment of the present invention, the same effect can be achieved by forming the valve body contacting surface of fingers 4c so that it has the surface roughness within the range of 18–35 μmRz.

Figure 6:
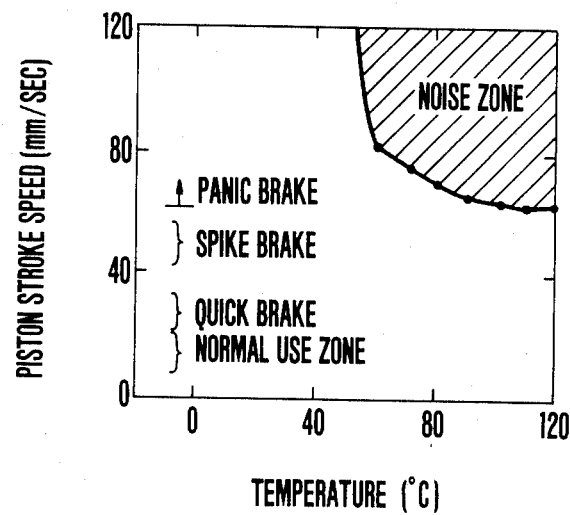
FIG. 6 shows the characteristics of relation between the piston stroke speed (mm/sec) of master cylinder and the brake fluid temperature (°C.) in the case where the surface roughness is not provided.

Incidentally, the characteristics of relation between the piston stroke speed (mm/S) and the brake fluid temperature (°C.) in a relief valve of which the surface roughness is not specially set is shown in FIG. 6. In such case, as seen from FIG. 6, the strange peep noise generates in the condition that the piston stroke speed is more than 60 mm/sec and the brake fluid temperature is more than 60° C. On the contrary, as stated in the foregoing, a relief valve of which the surface roughness of the valve body or the valve body side surface of fingers is set in accordance with the present invention can perfectly prevent the generation of such noise.

It should be understood that, although the preferred embodiment of the present invention has been described herein in considerable detail, certain modifications, changes, and adaptations may be made by those skilled in the art and that it is hereby intended to cover all modifications, changes and adaptations thereof falling within the scope of the appended claims.

What is claimed is:

1. A relief valve of hydraulic devices comprising:
   a first housing and a second housing to form a passageway for releasing hydraulic fluid, said first housing having a seating surface for a ball-shaped valve body and said second housing having a cylindrical portion fixedly inserted into said first housing,
   a coil spring disposed in said second housing for biasing said ball-shaped valve body against said seating surface of said first housing,
   a plurality of resilient finger-like portions formed at the lower end of said cylindrical portion of the first housing so as to extend through a gap between said coil spring and an inside wall surface of said first housing and to reach a gap between said valve body and said inside wall surface of the first housing, and
   said resilient finger-like portions nipping said valve body so as to guide said valve body in the direction of the axis of said second housing for preventing the vibration of said valve body in the direction of diameter of said second housing at the time of releasing hydraulic fluid from the relief valve through the gap between said valve body and the inside wall surface of said first housing.

2. A relief valve of hydraulic devices of claim 1, wherein the surface of said valve body has a surface roughness within the range of 0.5–12.5 μmRz under the standard of ISO Recommendation R-468-1966.

3. A relief valve of hydraulic devices of claim 1, wherein the valve body side surface of said resilient finger-like portions has a surface roughness within the range of 18–35 μmRz.

4. A relief valve of hydraulic devices of claim 1, wherein said second housing is made of nylon reinforced with glass-fibers.

* * * * *